(12) United States Patent
Honermann et al.

(10) Patent No.: US 8,091,799 B2
(45) Date of Patent: Jan. 10, 2012

(54) BOOM CRADLE SLIDE SYSTEM

(75) Inventors: John Honermann, Benson, MN (US); Jade Abner, Benson, MN (US); Bruce Bastin, Starbuck, MN (US)

(73) Assignee: CNH America LLC, Racine, WI (US)

( * ) Notice: Subject to any disclaimer, the term of this patent is extended or adjusted under 35 U.S.C. 154(b) by 546 days.

(21) Appl. No.: 12/187,527

(22) Filed: Aug. 7, 2008

(65) Prior Publication Data

US 2010/0032496 A1 Feb. 11, 2010

(51) Int. Cl.
*B05B 1/20* (2006.01)

(52) U.S. Cl. .......... 239/166; 239/69; 239/165; 239/167; 239/172

(58) Field of Classification Search .................... 239/69, 239/160, 165, 166, 167, 172
See application file for complete search history.

(56) References Cited

U.S. PATENT DOCUMENTS

| | | | |
|---|---|---|---|
| 3,581,993 A * | 6/1971 | Reams | 239/167 |
| 4,138,063 A | 2/1979 | Batts | |
| 4,392,669 A | 7/1983 | Martin, Jr. | |
| 4,595,140 A * | 6/1986 | Harden et al. | 239/167 |
| 4,673,130 A | 6/1987 | Simpson | |
| 4,790,484 A | 12/1988 | Wall | |
| 5,098,018 A | 3/1992 | Hader et al. | |
| 5,232,135 A | 8/1993 | Marren | |
| 5,348,226 A | 9/1994 | Heiniger et al. | |
| 6,012,648 A | 1/2000 | Morris | |
| 6,042,020 A | 3/2000 | Weddle | |
| 6,193,123 B1 | 2/2001 | Adamczewski et al. | |
| 6,450,379 B1 | 9/2002 | Cook | |
| 7,364,096 B1 | 4/2008 | Sosnowski et al. | |

FOREIGN PATENT DOCUMENTS

JP 2004267221 9/2004

* cited by examiner

*Primary Examiner* — Steven J Ganey
(74) *Attorney, Agent, or Firm* — Rebecca Henkel

(57) ABSTRACT

A boom cradle slide system for use with an agricultural sprayer vehicle is provided. The boom cradle slide system includes a boom cradle that holds a sprayer boom in a stowed position. A slide assembly connects the boom cradle to the sprayer vehicle and allows the boom cradle to move transversely or laterally nearer to or further from the sprayer vehicle. An actuator provides the mechanism for driving the slide assembly and correspondingly moving the boom cradle and sprayer boom. The actuator is operated from outside a cab of the sprayer vehicle.

4 Claims, 3 Drawing Sheets

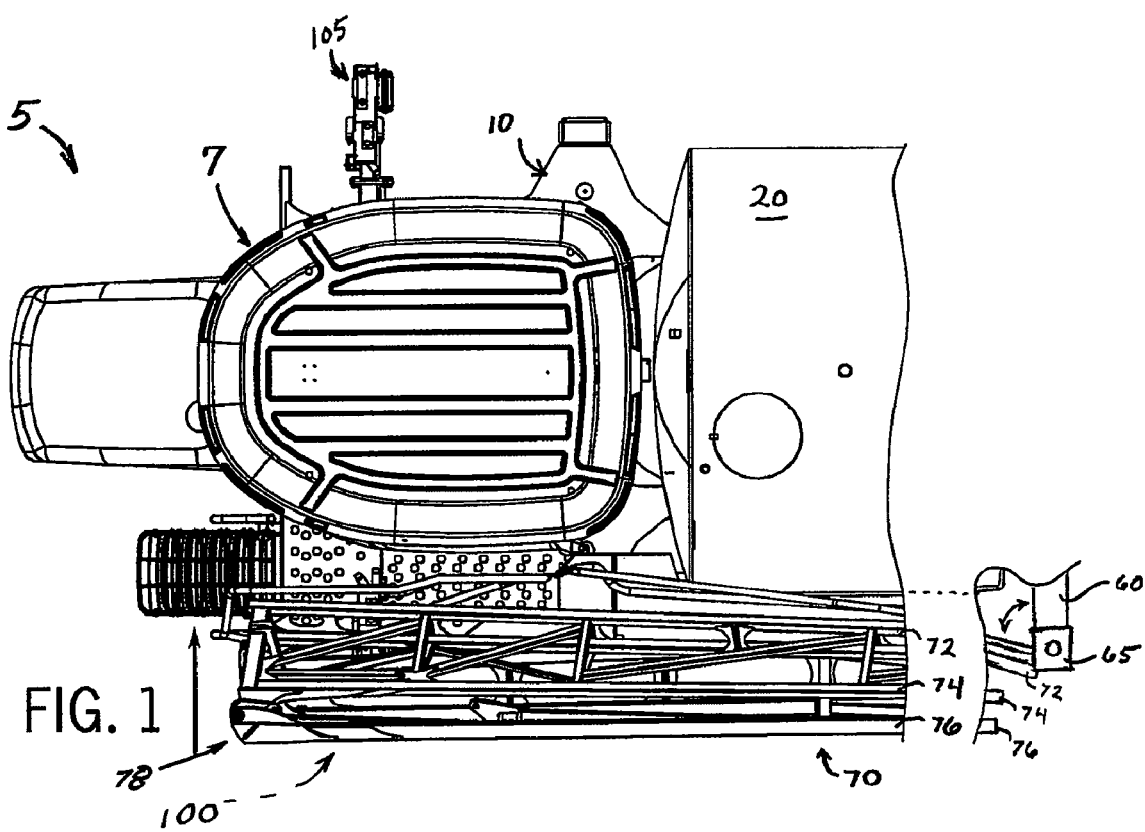
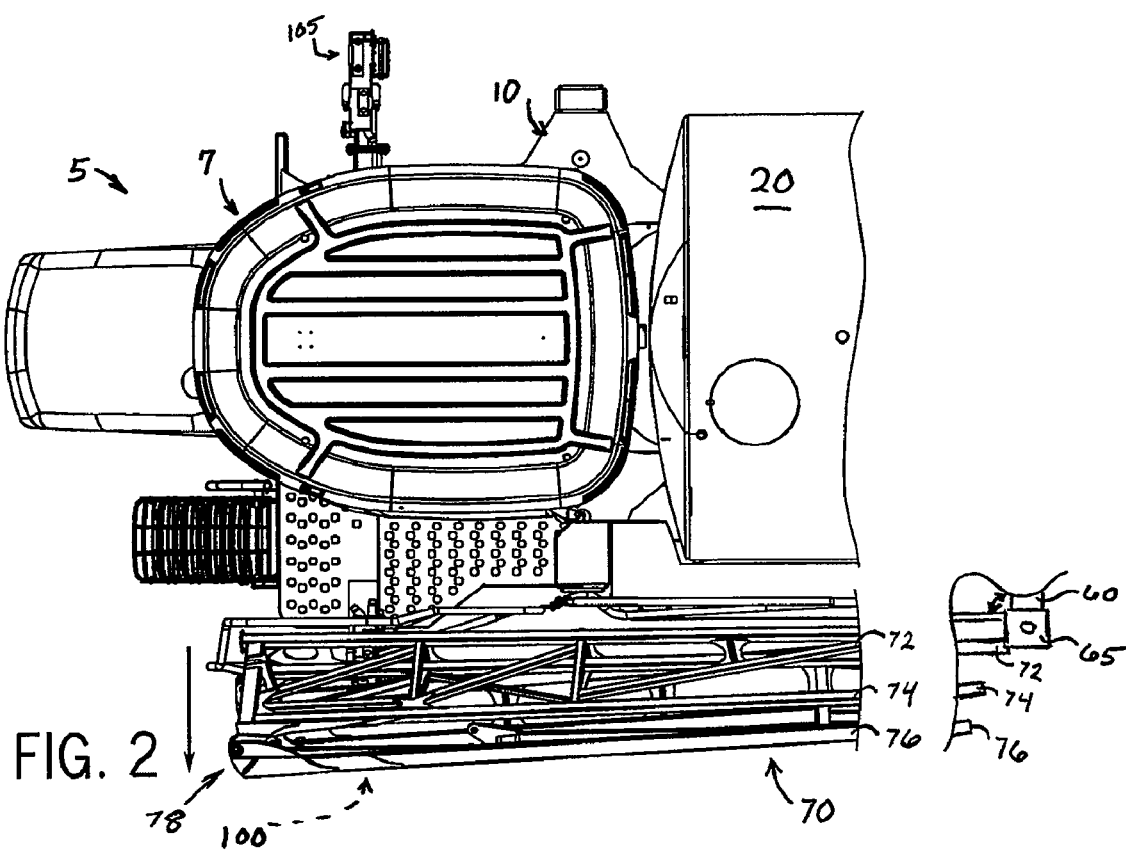

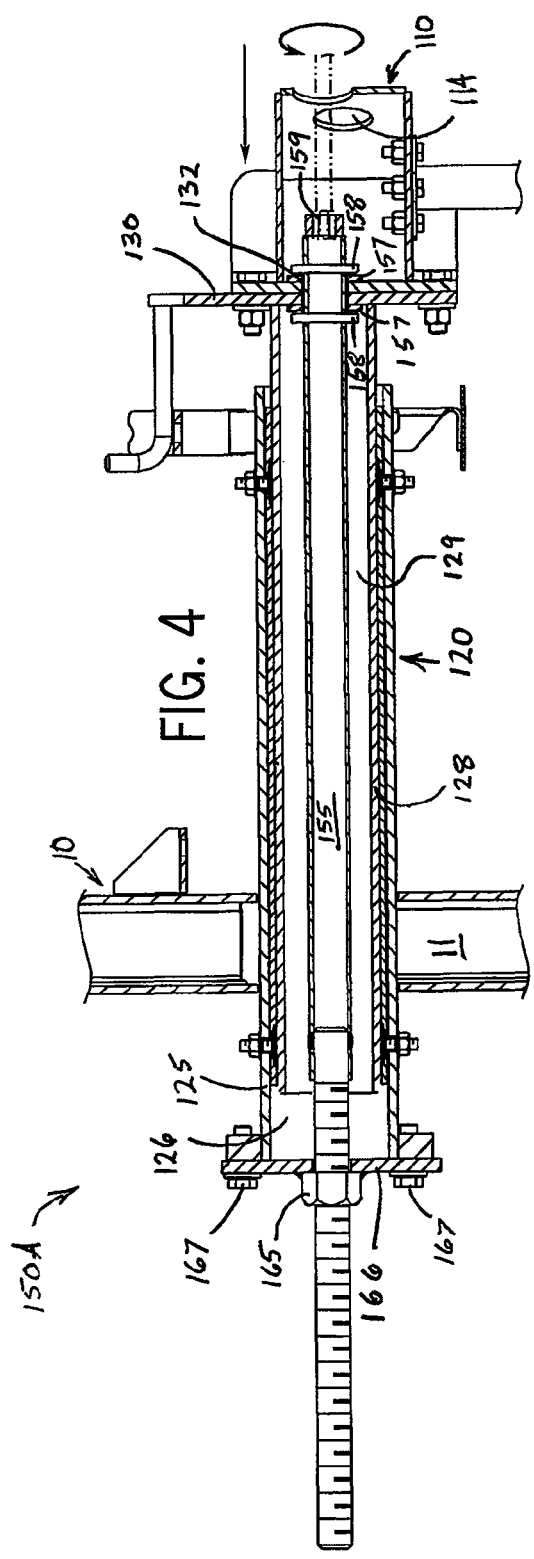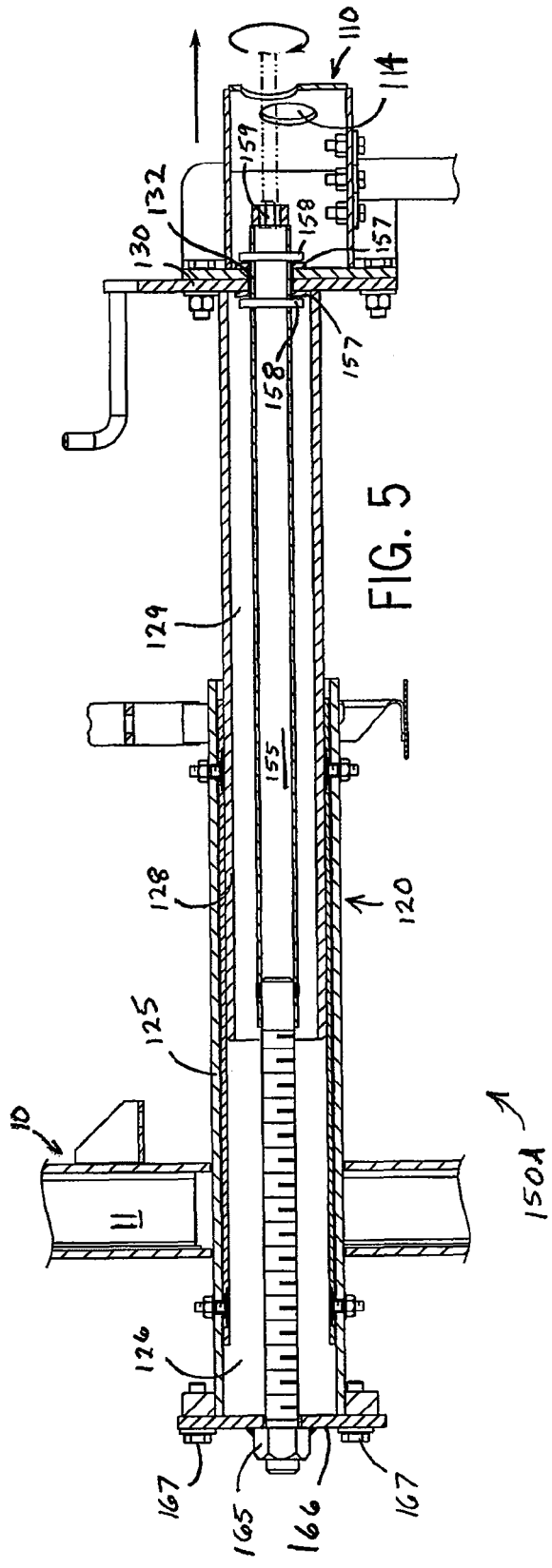

BOOM CRADLE SLIDE SYSTEM

FIELD OF THE INVENTION

The invention relates generally to agricultural sprayers with foldable booms, and more specifically, to a sprayer vehicle with an actuating boom cradle that can be moved or tucked inward toward the sprayer vehicle. When the boom cradle is tucked against the sprayer vehicle, its overall width dimension is reduced, making it easier to transport the sprayer vehicle using roadways. The boom cradle can be moved toward or tucked against the sprayer vehicle by an operator from outside a cab or main controls area of the sprayer vehicle. For sprayer vehicles that are transported over roadways using a truck and trailer, this configuration allows an operator to tuck the boom cradle against the sprayer vehicle when it is already loaded on the trailer, without requiring the operator to enter the cab or main control(s) area.

BACKGROUND OF THE INVENTION

Boom assemblies are commonly used on agricultural vehicles or applicators or implements, such as sprayers or planters, to dispense seed, fertilizer, insecticide, herbicide, etc. and other miscellaneous agricultural materials. The typical boom assembly is configured to pivot or fold between operative and inoperative positions relative to the boom support or sprayer vehicle. In its operative position, the boom assembly commonly extends in a lateral or transversely outward direction from the sprayer vehicles to a distance of, for example, approximately 120 feet such that the agricultural applicator covers a large surface area with each pass across a field.

After the spraying or distribution of the agricultural materials onto the field is completed, the boom assemblies are typically swung, pivoted, or folded to a retracted, inoperative, or stored position. The preferred folded inoperative position of the boom assembly is generally parallel to the direction of travel of the sprayer vehicle so that the boom assemblies and sprayer vehicle have a relatively narrow profile for transport from the field and on a roadway. When folded in for transportation, the back portions of the boom assemblies are supported by pivot assemblies that join the inner boom sections to the sprayer vehicles. Rack type structures, known as boom saddles or boom cradles, are provided near front portions of the sprayer vehicles for supporting the front portions of the folded in boom assemblies.

Large boom assemblies, such as those wider than about 100 feet, can have tri-fold configurations that include two vertically oriented pivot mechanisms attaching three boom segments to each other, and a third vertically oriented pivot mechanism attaching the boom assembly to the sprayer vehicle. Such tri-fold configurations are typically wider than bi-fold or uni-fold boom assembly configurations when folded, increasing an overall width of the sprayer vehicle to a relatively greater extent. The increased overall vehicle width can present various difficulties when transporting the sprayer vehicle, especially when the it is being transported by truck and trailer on a road, due to, for example, width and other standards and regulations for on-road trailers.

To compensate for such increased overall vehicle width, and to comply with on-road trailer width standards and regulations, some sprayer vehicles have a left-hand boom assembly that can be moved in closer to a cab of the sprayer vehicle. A telescoping cradle slide is provided on the left-hand side because portions of loads that extend beyond left-hand side of trailers can approach an opposing lane of two-lane highways, and sprayer vehicles typically occupy the entire width of the trailer or are laterally centered on the trailer for load balancing purposes. Such left-hand boom assemblies are configured to move closer to the cab by using the telescoping cradle slide that connects the boom cradle to the sprayer vehicle.

Known telescoping cradle slides require an operator to utilize controls within the cab for actuating such cradle slides. For example, to use a known telescoping cradle slide, an operator removes a pin from it, allowing it to move. Then the operator climbs into the cab and uses the boom hydraulic controls to hydraulically push the left-hand boom assembly inward, closer to the cab. In other words, with the pin removed, the left-hand boom assembly is pushed in so that the cradle slide telescopes inwardly, reducing its length, sliding the left-hand boom cradle nearer to the cab, and correspondingly reducing the overall vehicle width. Upon completion of this maneuver, the operator is in the cab and the left-hand boom assembly and boom cradle are nestled rather close to the cab.

However, sprayer vehicles incorporating known telescoping cradle slides have cab entry doors provided only on their left-hand sides because vehicle and implement controls occupy the right-hand interior portion of the cab such that right-hand entry doors are not practical. Accordingly, when left-hand boom assemblies are folded in to a transportation position, the freedom of movement of the cab entry door can be greatly restricted. When this happens, due to a restricted range of motion of the cab entry door, an operator can experience difficulties while trying to exit the cab.

SUMMARY OF THE INVENTION

There is a need for a boom cradle slide system that can be controlled by an operator located outside of a sprayer vehicle cab. There is also a need for a boom cradle slide system that can move a stowed sprayer boom to an inwardly retracted, trailering position in a relatively efficient manner.

The present invention provides a boom cradle slide system that meets the desires and needs described above, while being used, e.g., in combination with an agricultural sprayer vehicle. In a first embodiment of the present invention, a boom cradle slide for use with an agricultural sprayer vehicle is provided for allowing the sprayer vehicle to be relatively quickly adapted for being transported by trailer, on-road. This is accomplished by reducing an overall sprayer vehicle width, without requiring an operator to enter a sprayer vehicle cab.

It is contemplated for the boom cradle slide system to have a boom cradle that holds a sprayer boom in a stowed position, and a slide assembly that connects the boom cradle to the sprayer vehicle. The slide assembly is configured to allow the boom cradle to move transversely with respect to the sprayer vehicle. In other words, the slide assembly allows the boom cradle to move nearer to or further from a cab of the sprayer vehicle. It is contemplated that the slide assembly can include multiple telescoping segments such as pieces of tubing that are concentrically arranged and can longitudinally slide with respect to each other. It is further contemplated that an operator located outside of the cab controls the slide assembly and thereby moves the boom cradle and sprayer boom without having to enter the cab.

In some implementations, the boom cradle slide system includes an actuator that drives the slide assembly for moving the boom cradle. It is contemplated that the actuator can be a manually controlled configuration, such as a mechanical ball and screw type linear actuator. In this configuration, the actuator is driven by the operator, e.g., using a wrench or other hand tool to rotate a threaded rod or screw, causing it to advance or regress through a captured nut. The threaded rod or screw is connected to the boom cradle, whereby advancing or regressing the threaded rod or screw through the captured nut correspondingly moves the cradle slide relative to the sprayer vehicle. It is further contemplated that the same ball and screw type functionality can be accomplished with an electro-mechanical linear actuator that uses an electric motor to rotate the threaded rod or screw, in lieu of the operator manually rotating it with a wrench or other hand tool.

In still further implementations, the actuator is a pneumatic or hydraulic cylinder. The pneumatic or hydraulic cylinder can be mounted under the sprayer vehicle cab, for example, tucked between frame rails so that ground clearance is not compromised. This allows the actuator of the boom cradle slide system to be connected to the sprayer vehicle's onboard air or hydraulic systems and auxiliary controls. In this configuration, auxiliary controls can be located outside of the cab for controlling such onboard air or hydraulic systems and to drive the actuator of the boom cradle slide system. In yet other configurations, stand-alone air or hydraulic systems, separate from the sprayer vehicle's onboard systems, can be provided for driving the actuator of the boom cradle slide system.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 1 illustrates a top plan view of a first embodiment of a boom cradle slide system in accordance with the present invention, holding a sprayer boom in a stowed, non-trailering position.

FIG. 2 illustrates a top plan view of the boom cradle slide system of FIG. 1 holding the sprayer boom in a stowed, trailering position.

FIG. 4 illustrates a cross-sectional view of the actuator of FIG. 3 in a trailering position.

FIG. 5 illustrates a cross-sectional view of the actuator of FIG. 3 in a non-trailering position.

DETAILED DESCRIPTION OF THE PREFERRED EMBODIMENTS

Figure 3:
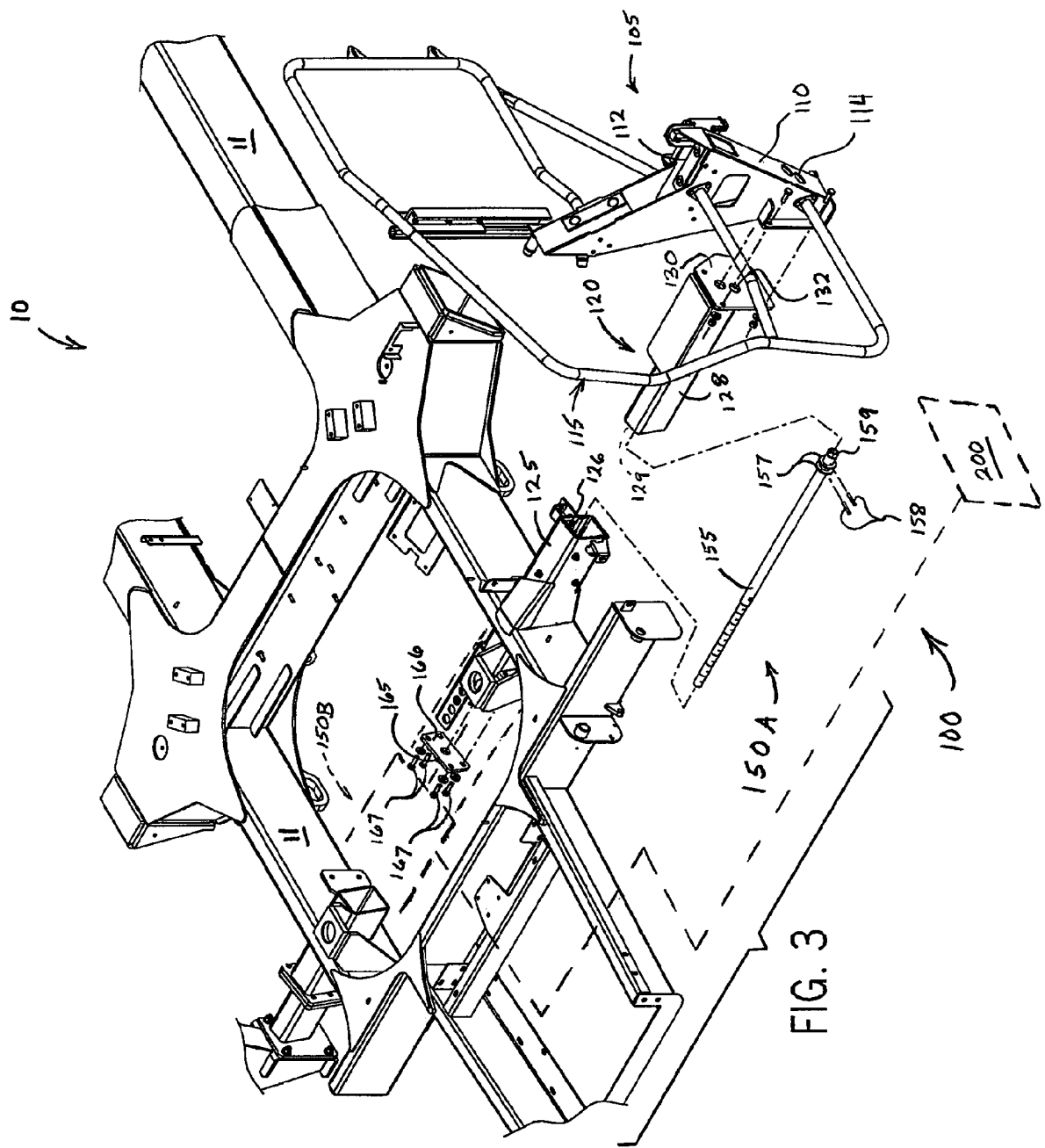
FIG. 3 illustrates an exploded pictorial view of a boom cradle slide system incorporating a first embodiment of an actuator, along with portions of a sprayer vehicle frame.

FIG. 1 shows a first embodiment of a boom cradle slide system; namely, boom cradle slide system 100, employed on an agricultural sprayer vehicle 5. Although boom cradle slide system 100 is described in combination with a sprayer vehicle 5 that is self-powered, it should be understood that the invention is not so limited. The boom cradle slide system 100 can be employed in combination with a towed agricultural sprayer in a similar manner and is accordingly well within the scope of the invention.

Although no specific sprayer vehicle 5 is illustrated, it is well understood that boom cradle slide system 100 can be incorporated into any of a variety of suitable agricultural sprayers. Numerous suitable sprayer vehicles include various ones manufactured by CNH America LLC, such as the Case IH Patriot Sprayer model 4420, and others.

Still referring to FIG. 1, sprayer vehicle 5 includes a cab 7 that is mounted upon a frame 10. Frame 10 provides the main structural component of the sprayer vehicle 5, supporting the running gear (not labeled) and drive train components (not labeled), as well as a storage tank 20, shown in a mid-mounted configuration, and a boom assembly 50. Storage tank 20 and boom assembly 50 are fluidly connected to each other and cooperate to, for example, apply crop pesticides or herbicides, nutrients, or animal/human waste (sludge) to soils, typically before and after planting in the spring and/or after harvest in the fall.

Referring still to FIG. 1, boom assembly 50 includes a central boom frame 60, a left sprayer boom 70, and a right sprayer boom (not shown). The left sprayer boom 70 and right sprayer boom are provided on left and right-hand sides of the sprayer vehicle 5, respectively. The central boom frame 60 is attached to and extends transversely across a rear portion of the sprayer vehicle 5. Hinges 65 are provided at the outer ends of central boom frame 60 for attaching the sprayer booms 70 to the central boom frame 60 and, thereby, also to the sprayer vehicle 5, allowing the sprayer booms 70 to pivot with respect thereto.

Referring yet further to FIG. 1, sprayer booms 70 can include multiple segments that are hinged to each other, facilitating stowing the sprayer booms 70 in a relatively collapsed or folded manner. In some implementations, each sprayer boom 70 can include two segments joined by an intermediate hinge. In other implementations, such as that shown in FIG. 1, sprayer boom 70 has three distinct segments, namely, inner section 72, middle section 74, and outer section 76. One end of inner section 72 is attached to hinge 65 and the other end connects to middle section 74. An end of middle section 74 that is not connected to inner section 72 is connected to outer section 76.

Referring now to FIGS. 1 and 2, in this tri-folded configuration, the length of sprayer boom 70 can be reduced by about one-third when the inner, middle, and outer sections 72, 74, and 76 are folded upon each other and stowed in, for example, a non-trailering stowed position (FIG. 2) having the stowed sprayer boom 70 laterally or transversely displaced from the cab 7, or a trailering position (FIG. 1) having the stowed sprayer boom 70 nested adjacent the cab 7. Regardless of whether the sprayer boom 70 is in a non-trailering (FIG. 2) or trailering (FIG. 1) stowed position, when sprayer boom 70 is in its tri-folded configuration, its forward end 78 rests upon and is supported by a boom cradle slide system 100.

Referring now to FIG. 3, boom cradle slide system 100 includes a boom cradle 105, slide assembly 120, actuator 150A, 150B, and in some implementations controls 180. Boom cradle 105 includes a cradle body 110 with a shelf 112 that supports a forward end 78 of the folded and stowed sprayer boom 70 and an access hole 114 that permits access to other components of boom cradle slide system 100, explained in greater detail elsewhere herein. A rail 115 is attached to cradle body 110 and extends in front of and over the body and is configured to provide a grasping surface or handrail-type structure for operators entering cab 7 (FIG. 2).

Referring still to FIG. 3, slide assembly 120 connects the boom cradle 105 to frame 10, allowing it to move with respect thereto. Slide assembly 120 can be any of a variety of suitable structures that allow the boom cradle 105 to repeatedly move along a predetermined path, toward and away from the cab 7. As illustrated, slide assembly 120 includes multiple telescoping segments, e.g., receiver 125 and post 128 that cooperate with each other to define a variable length of the slide assembly 120.

Receiver 125 can extend perpendicularly with respect to a length of the sprayer vehicle 5, for example, perpendicularly away from a frame rail 11 of frame 10. An opening 126 extends longitudinally into or through the receiver 125 and can also extend transversely through an aligned portion of the frame rail 11. Opening 126 is configured to receive post 128 therein, and provides enough clearance between the facing inner surface of receiver 125 and outer surface of post 128 to allow post 128 to freely slide within and along the length of receiver 125. In some implementations, an opening 129 extends longitudinally into or through post 128, so that it opens into the opening 126 of receiver 125. An endcap 130 can extend across and generally close an outermost end of post 128. Endcap 130 provides the mounting structure to which cradle body 110 attaches, joining the boom cradle 105 to the slide assembly 120. A bore 132 can extend through the endcap 130 and extend into the opening 129 of post 128.

Still referring to FIG. 3, slide assembly 120 can house an actuator 150A, 150B, therein, for example, within a space defined by bore 129 and/or bore 126 of the post 128 and receiver 125, respectively. In other implementations, actuator 150A, 150B is housed relatively near and cooperates with the slide assembly 120. In most implementations, the actuator 150A, 150B is connected to both post 128 and also some fixed component of the sprayer vehicle 5 such as frame rail 11 or other portion of frame 10, receiver 125, and/or others. In this configuration, the actuator can pull or push the post 128 so that it longitudinally advances into or regresses out of receiver 125, correspondingly moving the boom cradle 105 near to or further from cab 7.

Referring now to FIGS. 3-5, in some implementations, actuator 150A includes a screw or threaded rod 155 and a cooperating captured nut 165, similar to a manually operated mechanical ball and screw-type linear actuator. Threaded rod 155 can have a pair of thrust washers 157, which are retained in place by a pair of pins 158, that lie on opposing sides of the endcap 130. Thrust washers 157 longitudinally fix the threaded rod 155 with respect to endcap 130, locking the threaded rod 155 and post 128 into translational unison in a longitudinal direction while at the same time allowing the threaded rod 155 to freely rotate within the bore 132 and endcap 130.

An end 159 of the threaded rod 155, located furthest from frame 10, extends through bore 132 and beyond the endcap 130, whereby it is accessible from alongside the sprayer vehicle 5. The end 159 of threaded rod 155 preferably includes a tool interface structure such as a bolt head or socket cap, allowing on operator of sprayer vehicle 5 to rotate the threaded rod 155 with a corresponding hand tool or other appropriate tool. End 59 can be shielded or protected from impacts by various protective structure(s). Preferably, in the complete assemblage of boom cradle slide system 100, end 59 is housed in a void space within the cradle body 110, whereby cradle body 110 generally encapsulates and fully shields the end 59 from damage during use. It is noted that in such implementations, access hole 114 that extends through an outwardly facing wall of cradle body 110 is aligned or registered with end 59. This allows an operator to insert a hand tool or other tool through the access hole 114 and engage the end 59 for manually manipulating actuator 150A.

Still referring to FIGS. 3-5, captured nut 165 is registered and aligned with threaded rod 155. Captured nut 165 can be attached directly to an end of the receiver 125, or can be attached to a plate 166 that is connected thereto by bolts 167 or other fasteners or methods of joining. In the complete assemblage of actuator 150A, threaded rod 155 engages the threads of captured nut 165 for moving cooperating components of the slide assembly 120.

For example, since captured nut 165 is fixed in position, when threaded rod 155 rotates, it axially advances through or regresses from the captured nut 165. Likewise, since threaded rod 155 and post 128 are locked into longitudinal translational unison, rotating the threaded rod 155 and moving it with respect to captured nut 165 correspondingly moves post 128 and boom cradle 105 with respect to frame 10 and cab 7. FIG. 4 shows the slide assembly 120 in a relatively reduced length trailering position, corresponding to FIG. 1. In the trailering position, the threaded rod 155 is advanced substantially through and extends largely beyond the captured nut 165. FIG. 5 shows the slide assembly 120 in an extended length non-trailering position, corresponding to FIG. 2. In the non-trailering position, the threaded rod 155 is withdrawn substantially from captured nut 165, for example, the end of threaded rod 155 extending only slightly beyond the captured nut 165.

Referring again to FIG. 3, in some implementations, actuator 150A is not driven by manual force from an operator, but rather is an electromechanical device using an electric motor to vary the length of slide assembly 120. In such implementations, end 159 can be driven directly, or by way of an intervening gear train, from an electric motor (not shown). Controls 180 are provided to allow the operator to manipulate actuator 150A and vary the length of slide assembly 120. Controls 180 are located outside of the cab 7, allowing the operator to control the actuator 150A from outside. Preferably, controls 180 are located near components of the sprayer vehicle 5 that the operator will inspect during the course of loading and securing the sprayer vehicle 5 to a trailer, reducing the amount of time required for trailering preparation(s).

Referring still to FIG. 3, controls 180 need not control electromechanical versions of actuator 150A, but can be used to control other moving devices such as actuators 150B. Actuators 150B can be two-way driving cylinders, for example, hydraulic, pneumatic, or hydro-pneumatic (sometimes referred to as "air over oil") cylinders. Actuators 150B function largely analogously to actuators 150A in that they are attached at a first end, directly or indirectly, to a fixed component of sprayer vehicle 5 and attached at a second end to a portion of post 128, for varying the length of slide assembly 120. For example, actuator 150B can be housed under cab 7, attached to one of the frame rails 11 or elsewhere on frame 10, and extend and connect to endcap 130 or elsewhere on post 128, optionally, some other movable component of boom cradle slide system 100.

Still referring to FIG. 3, the cylinder of actuator 150B can be plumbed or otherwise incorporated into the onboard, original equipment, hydraulic or pneumatic/air system of sprayer vehicle 5. In this configuration, controls 180 serve as an auxiliary control interface, outside of cab 7, for operating the boom cradle slide system 100 as a component of the onboard hydraulic or air system of sprayer vehicle 5. These embodiments of controls 180 also include controls to start, control, and turn off the engine of sprayer vehicle 5, to the extent that such engine is required to run for operating the onboard hydraulic or air systems.

In some implementations, the cylinder of actuator 150B is powered by the onboard hydraulic or air systems of the truck, e.g., road tractor, that will pull the trailer for hauling the sprayer vehicle 5. In this configuration, the actuator 150B is temporarily connected to, and controls 180 serve as auxiliary controls of, the truck's hydraulic or air system. This allows operators to tuck the sprayer booms 70 against cabs 7, to a trailering position (FIG. 1) without using power from the sprayer vehicle's 5 manual power from the operators themselves. In yet other implementations, the cylinder of actuator 150B is powered by a standalone hydraulic or pneumatic system that is, for example, provided on the sprayer vehicle 5 or trailer yet distinct from the primary system(s) of the sprayer vehicle 5, trailer, or truck.

In light of the above, referring again to FIGS. 1 and 2, to use the boom cradle slide system 100, an operator folds the sprayer boom(s) 70 inwardly toward the sides of the sprayer vehicle 5, resting the forward end 78 of the sprayer boom upon the boom cradle 105. At this point, the sprayer boom 70 is in a stowed, non-trailering position, shown in FIG. 2. At this point, a portion of sprayer boom 70 nearest the sprayer vehicle 5 and the central boom frame 60 define approximation of a right angle therebetween, at hinge 65.

Still referring to FIGS. 1 and 2, with the sprayer boom 70 in the non-trailering position (FIG. 2), the operator drives the sprayer vehicle 5 onto a trailer that is hooked to a truck. The operator then exits cab 7 and, while the sprayer vehicle 5 is on the trailer, draws the forward end 78 of sprayer boom 70 closer to the cab 7, nesting the sprayer boom 70 near the sprayer vehicle 5, into the trailering position (FIG. 1). Doing so pivots the sprayer boom 70 further about a pivot axis of hinge 65, whereby the portion of sprayer boom 70 nearest the sprayer vehicle 5 and the central boom frame 60 define an acute angle therebetween. To move the sprayer boom 70 from the non-trailering position (FIG. 2) to the trailering position (FIG. 1), the operator manipulates actuator 150A, 150B to reduce the length of slide assembly 120 and thereby move the boom cradle 105 nearer the frame 10 of sprayer vehicle 5.

Accordingly, when actuator 150A includes a manually powered ball and screw-type mechanism, the operator uses a wrench or other hand tool, optionally other tool, and manually rotates the threaded rod 155 by way of the tool interface on end 159. For electromechanical implementations of actuator 150A, or for hydraulic or pneumatic implementations of actuator 150B, the operator uses controls 180 to activate or energize the actuator 150A, 150B to move the boom cradle 105 nearer the sprayer vehicle. At a delivery site, these procedures are generally reversed to push the sprayer boom 70 away from the sprayer vehicle 5, from the trailering position (FIG. 1) to the non-trailering position (FIG. 2), once again permitting access to cab 7.

While the invention has been shown and described with respect to particular embodiments, it is understood that alternatives and modifications are possible and are contemplated as being within the scope of the present invention. For example, manually powered actuators 150A, and non-manually powered actuators 150A, 150B are not necessarily mutually exclusive. Accordingly, as desired, both a hydraulic actuator 150B and a manually powered ball and screw type actuator 150A can be provided within a single boom cradle slide system 100. For such multiple actuator 150A, 150B implementations, the hydraulic actuator 150B can serve as a primary actuator whilst the manually powered ball and screw-type actuator 150A can serve as an emergency backup actuator in the event of a hydraulic system or component failure, whereby it should be understood that the number of actuators 150A, 150B employed on the boom cradle slide system 100 is not limiting on the invention.

Many changes and modifications could be made to the invention without departing from the spirit thereof. The scope of these changes will become apparent from the appended claims.

We claim:

1. An agricultural sprayer vehicle, comprising:
    a sprayer boom;
    a boom cradle supporting an end of the sprayer boom when the sprayer boom is being stowed, the boom cradle having (i) a non-trailering position, and (ii) a trailering position;
    a slide assembly operably connected to a frame of the agricultural sprayer vehicle and moving the boom cradle from the non-trailering position to the trailering position,
wherein an operator at a location outside a cab of the sprayer vehicle controls the slide assembly;
wherein the slide assembly moves from the non-trailering position to the trailering position by way of an operator manually manipulating the slide assembly.

2. A boom cradle slide system for an agricultural sprayer vehicle, comprising:
    a boom cradle holding a sprayer boom in a stowed position;
    a slide assembly connecting the boom cradle to the sprayer vehicle and allowing the boom cradle to move toward or away from a cab of the sprayer vehicle; and
    an actuator driving the slide assembly for moving the boom cradle toward or away from the cab,
wherein the actuator is manipulated by an operator at a location outside of the cab;
wherein the actuator includes a threaded rod;
wherein the actuator is a mechanical ball and screw.

3. The boom cradle system assembly as in claim 1, further comprising a control structure located outside of the cab, the control structure communicating with the actuator and directing movement of the boom cradle.

4. The boom cradle system assembly as in claim 1, wherein the actuator is manually manipulated by the operator.

* * * * *